United States Patent [19]

Koerner

[11] Patent Number: 5,175,540
[45] Date of Patent: Dec. 29, 1992

[54] VARIOMETER SYSTEM FOR SOARING FLIGHT

[76] Inventor: Ralph J. Koerner, P.O. Box 1320, Ramona, Calif. 92065

[21] Appl. No.: 646,665

[22] Filed: Jan. 28, 1991

[51] Int. Cl.⁵ ............................................. G01C 21/10
[52] U.S. Cl. ............................ 340/870.160; 73/178 R; 73/179
[58] Field of Search ................... 340/870.16, 945, 946, 340/963, 970; 364/424.01, 424.06, 571.02, 571.05; 244/16; 73/384, 179, 178 R

[56] References Cited

U.S. PATENT DOCUMENTS

| 3,748,900 | 7/1973 | Lindquist | 73/178 R |
| 3,789,661 | 2/1974 | Melsheimer | 73/179 |
| 4,061,028 | 12/1977 | Nicks | 73/179 |
| 4,086,810 | 5/1978 | Ball | 73/384 |
| 4,127,249 | 11/1978 | Lambregts | 73/178 R |

OTHER PUBLICATIONS

Koerner, "Total Energy Reconsidered", Soaring & Motorgliding, vol. 54, No. 2, Feb. 1990—pp. 25-28.

Primary Examiner—Donald J. Yusko
Assistant Examiner—Michael Krakovsky
Attorney, Agent, or Firm—Freilich, Hornbaker & Rosen

[57] ABSTRACT

Apparatus for use in a glider for indicating the rate of vertical air mass movement. The apparatus includes sensing means for detecting both glider airspeed and acceleration orthogonal to the plane of the wings. This information is used to modify the output display of a conventional variometer to eliminate the effects of drag.

11 Claims, 7 Drawing Sheets

VARIOMETER SYSTEM FOR SOARING FLIGHT

FIELD OF THE INVENTION

This invention relates generally to aircraft instrumentation and more particularly to glider borne equipment for the detection of rising and sinking air.

Motorless soaring flights by gliders can be sustained for many hours and tens or even hundreds of miles can be traversed in the process. Such flights are made possible by a very sensitive and fast altitude rate sensing instrument called a variometer. This instrument aids the pilot in the critically important task of detecting rising and sinking air. Unfortunately, much of the time the information provided by the variometers in common use today is not interpretable in terms of air motion due to frequent and significant, pilot and atmosphere induced wing load factor changes.

The background and limitations of presently existing variometers, and proposed improvements, are discussed by applicant in an article in SOARING, Feb., 1990, entitled "Total Energy Reconsidered", page 25, which article is by reference incorporated herein.

SUMMARY OF THE INVENTION

The present invention is directed to an improved variometer which more accurately reports the rate of vertical movement of the air mass the glider is passing through.

In accordance with the present invention, wing load factor changes are sensed and their effect on the glider's performance calculated, and then eliminated from the signal driving the variometer display to thus provide more useful information to the pilot.

In a preferred embodiment of this invention, sensing devices are provided to detect both acceleration of the glider in a direction orthogonal to the plane of the wings and speed of the glider. Information from these sensing devices in conjunction with computed and/or stored glider flight performance characteristics data is used to alter the output of the variometer.

Further objects and advantages of this invention will be apparent from a consideration of the drawings and the ensuing description thereof.

BACKGROUND

Figure 1:
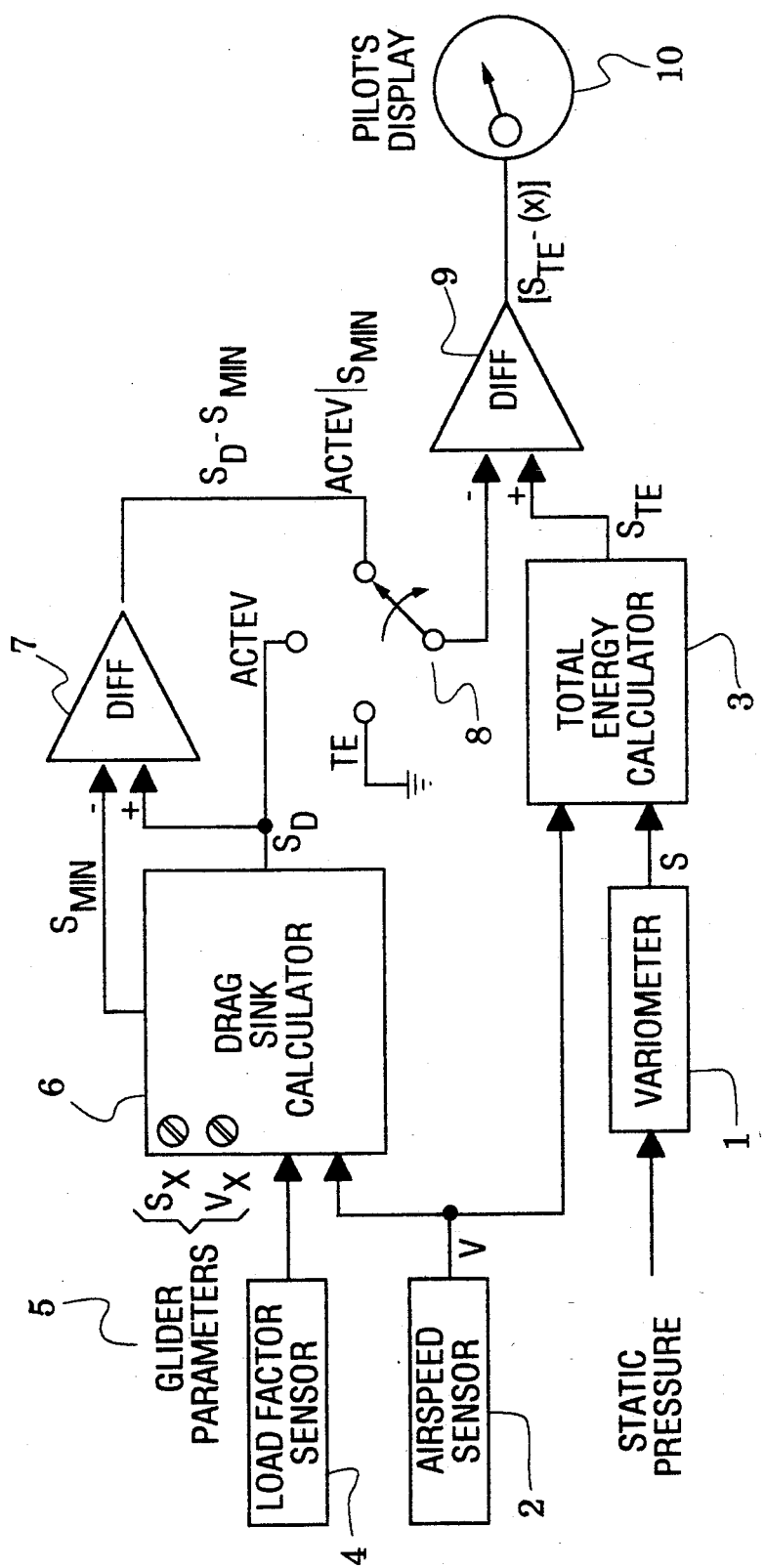
FIG. 1 is a block diagram illustrating a preferred embodiment of the invention.

A glider flying through still air will descend at a rate determined by it's aerodynamic qualities, wing load factor and speed. Minimum still air sink rates for gliders in common use are in the range of 100 ft/min to 300 ft/min. Sink rate typically increases with load factor and/or speed. When a glider flies through a moving air mass it's net motion is the algebraic sum of the gliders motion and that of the air mass. Thus, when a glider flies in rising air, or lift, where the ascent rate of the air exceeds the still air sink rate of the glider, the glider climbs. Of course, the converse is true, when the glider flies in subsiding air, sink, it's descent rate is increased.

Generally, lift is sparsely located but intense, whereas sink abounds but is weak. Lift is sometimes organized in a predictable fashion, but more often it is randomly located. Human senses cannot detect regions of lift or even accurately report a glider's descent or climb once altitudes of a few hundred feet are reached. Detection of lift and descent or climb, is accomplished by an instrument well known as a variometer.

The basic variometer is a rate of climb reporting device similar to—but faster and more sensitive than—the rate-of-climb instruments common on powered aircraft. It senses changes in the barometric pressure of it's environment, and reports them as climb or descent. An improved variometer version in common use on gliders utilizes airspeed as well as barometric pressure to report changes in the "total energy", kinetic +potential, of the glider. The total energy type variometer displays changes in the gliders ability to sustain flight rather than simply changes in it's altitude. Those changes are conventionally expressed as climb or descent, e.g. feet per minute.

In order to sustain flight the soaring pilot endeavors to fly rapidly through regions of sink, and to slow and/or circle for climb when regions of lift are encountered. Locating and flying in lift is the primary strategy. Variometers have proven essential to the task but those in common use are imperfectly suited in that they report glider motion not air motion. In terms of the vertical air motion information needed, they are strictly accurate only in steady-state accelerationless conditions because the air mass data they communicate has been transformed through the dynamic characteristics of the glider.

In some common flight circumstances variometer information is so confounded by high load factor maneuvers as to defy interpretation by the pilot. An example is the important situation of entry into lift from cruising flight. In sequence: the glider happens into lift; the pilot perceives that fact via the variometer; he then immediately pulls up to slow and circle for climb. Both the abrupt pull up and the sharp turn to start circling contribute to cause load factor to increase markedly. The increased load factor, in turn, increases drag to cause a greatly increased glider sink rate during the initial period of entry into the lift.

The pull-up/turn induced degradation of the glider's performance occurs during the most critical instants of the first encounter with lift. The variometer's report of the glider's load factor induced transient loss of total energy obscures the strength and location of the lift which the pilot is attempting to find and pull into. After initially observing lift on the variometer the pilot pulls up and turns only to see sink through most of the pull-up/turn maneuver. He is blinded as to direction and intensity of the lift he is passing through and so is unable to optimize steering to center on lift.

A similar obfuscation of critically needed atmospheric lift /sink information takes place in straight cruising flight. In a typical such situation the variometer indicates lift has been encountered so to secure maximum climb benefit from the lift the pilot pulls up sharply. The pull-up increases load factor and drag increases. The variometer now indicates heavy sink and the pilot is confused. Of course a similar but reverse sequence occurs when sink is encountered and the pilot seeks to minimize loss of altitude by pushing over to speed through it. Such maneuvers are important to flight optimization but are difficult to execute because of the misleading variometer responses.

Yet further difficulties with the variometers in common use are encountered when gliders are flown in turbulent conditions. The turbulence results in frequent random accelerations of the glider. The consequent rapidly shifting wing loading can result in radical gyrations of the variometer display. In such conditions variometers provide little interpretable information regarding general air mass movement.

Figure 3A:
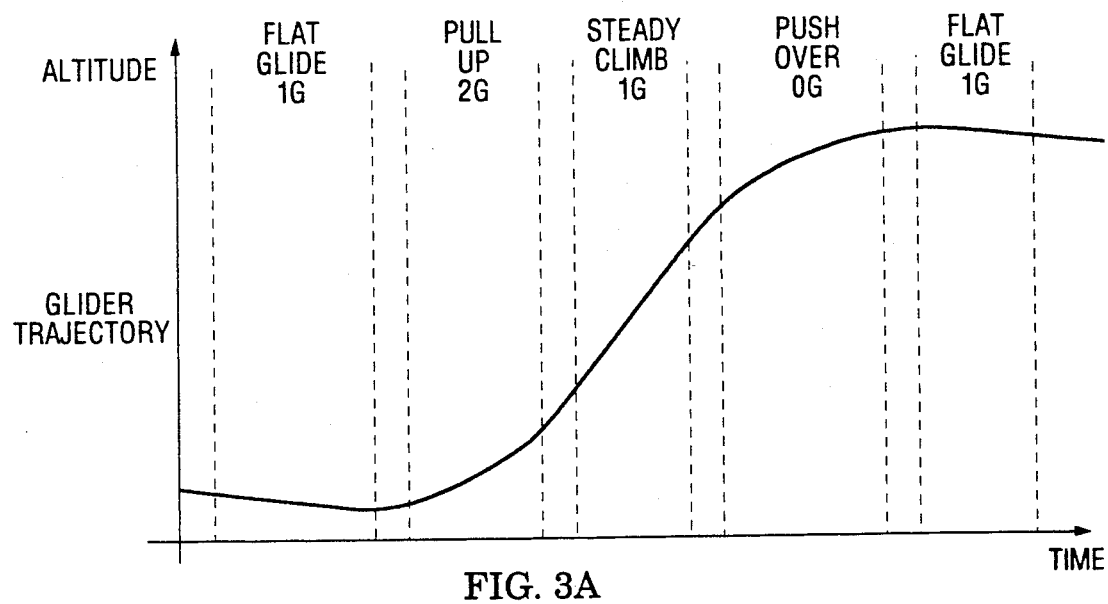
FIGS. 3A, FIG. 3B and FIG. 3C. respectively illustrate glider level flight, pull up, climb and push over maneuvers; their consequent load factor effects; and the sink rates resulting.
Figure 3B:
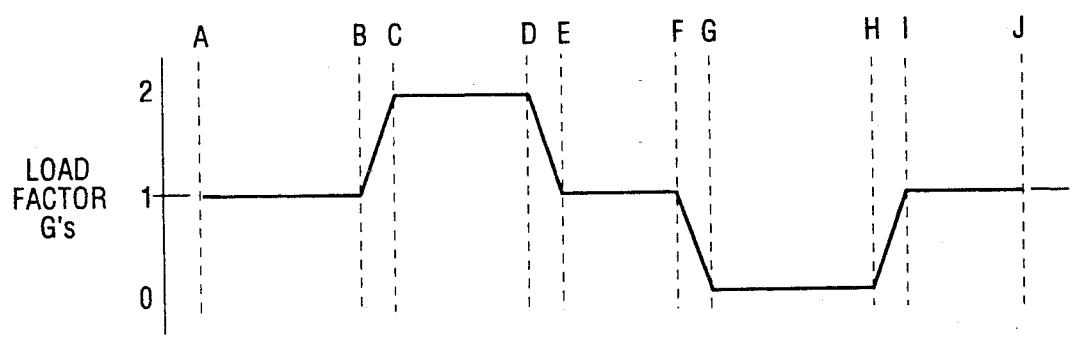
Figure 3C:
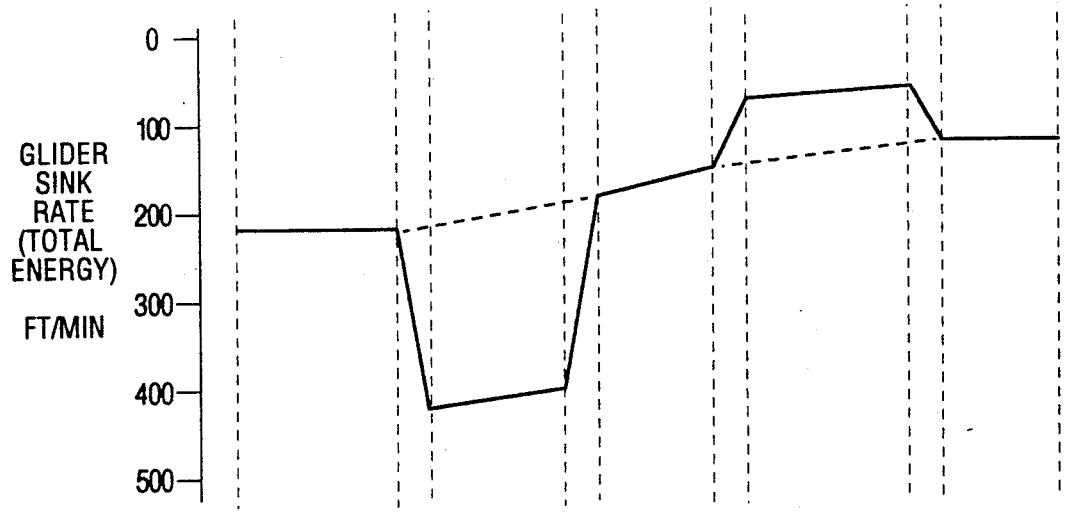
Figure 4:
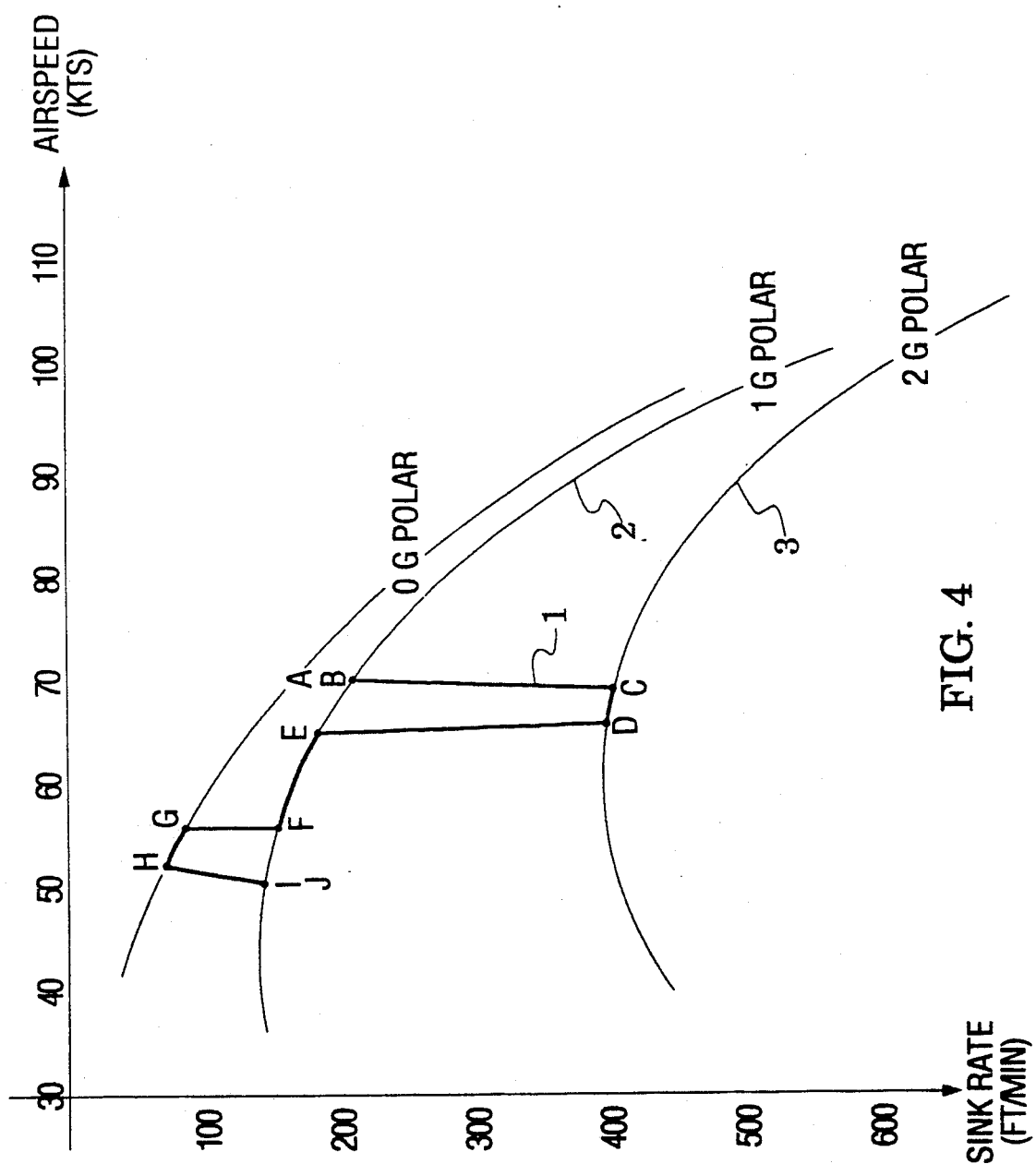
FIG. 4 is a multi-load factor polar plot of sink rate versus speed. The sink rate plot of FIG. 3C was derived using FIG. 3B and this figure.

FIGS. 3 and 4 graphically illustrate the limitations of state of the art variometers. In FIG. 3A a glider transitions from "level" gliding flight at one altitude to "level" gliding flight at a higher altitude. FIG. 3B shows the load factor effects of the glider's trajectory. In FIG. 4 the effects of load factor and speed changes are plotted on a multi-load factor polar diagram. Note that in this example during the pull-up process positive acceleration occurs and the locus 1 shifts from the 1G polar 2 to the 2G polar 3 with a consequent large increase in sink rate. The converse occurs during the push-over. FIG. 3C summarizes the sink rate consequences of the glider's maneuver as interpreted from FIG. 4. Large excursions in sink rate as B to E and F to I of FIG. 3C illustrate the problem addressed by this invention. Such large changes tend to obscure the air mass motion information the pilot needs.

DESCRIPTION OF PREFERRED EMBODIMENTS

In order to facilitate an understanding of the manner in which the invention may be practiced and before considering particular systems in accordance with the invention, attention will be given to some physical properties of a glider in flight.

In normal flight the sink rate of a glider flying in still air is determined by the resistance to movement through the air of the glider. That resistance is called drag. Drag can be regarded to consist of the sum of two principal components:

(1) Induced drag, $D_i$ and
(2) Parasitic drag, $D_p$.

Induced drag is largely a reaction to the lift of the wings. It takes the simplified form $$D_i = K_i(L/V)^2.$$

Where $K_i$ is a constant,
L is the load factor on the wings and
V is the aircraft's airspeed.

Parasitic drag is the consequence of pushing the aircraft through the air. It takes the form $$D_p = K_p(V)^2.$$

Where $K_p$ is a constant.

Total drag consists of the sum of the induced and the parasitic drag components as $$D_t = D_i + D_p = K_i(L/V)^2 + K_p V^2.$$

Via conservation of energy sink rate can be deduced from the drag resistance times the speed as $$SW = VD_t.$$

Where
S is the sink rate and
W is glider mass.
Thus $$S = V/W[K_i(L/V)^2 + K_p V^2]. \quad (1)$$

Figure 2:
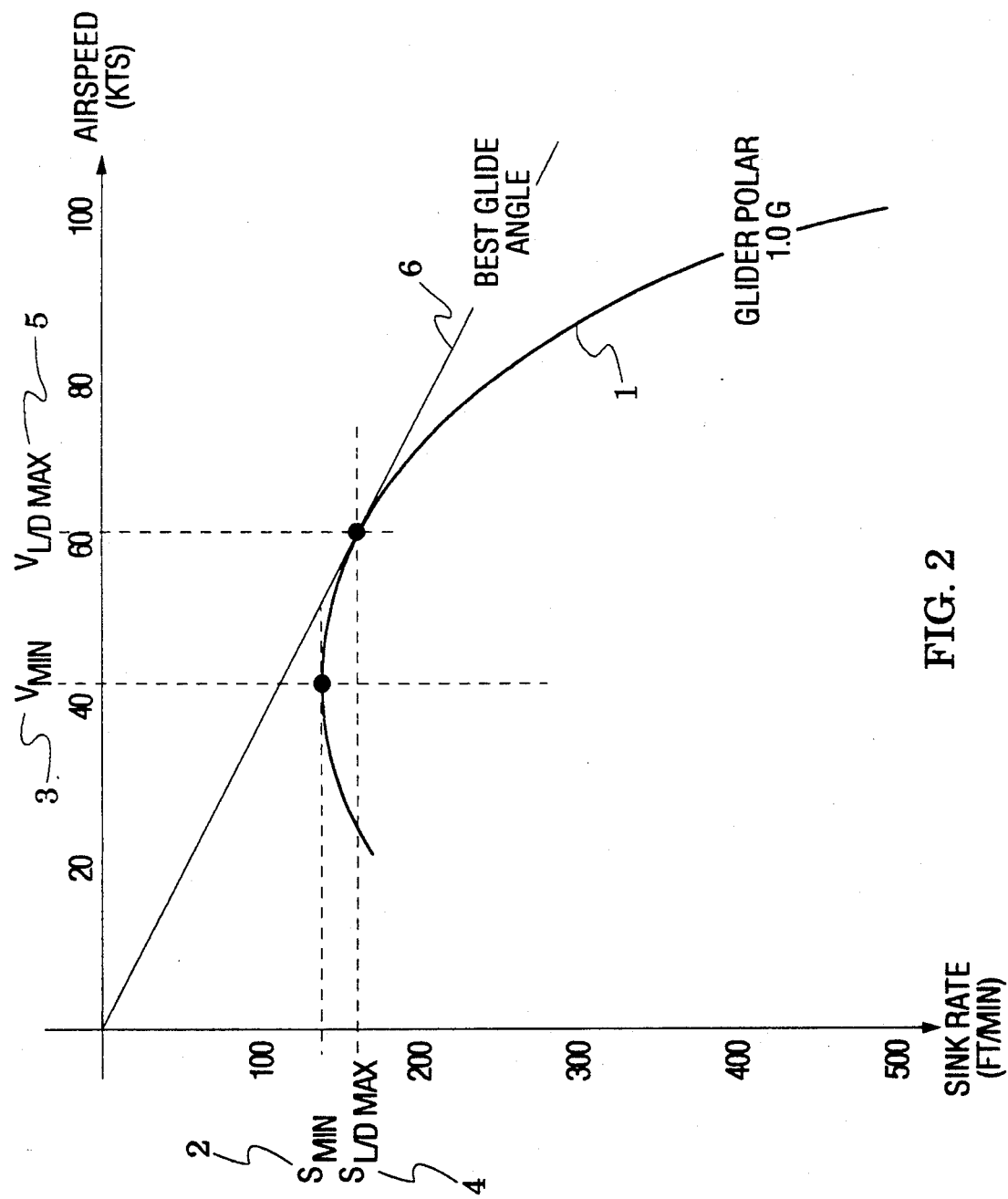
FIG. 2 is a plot of glider sink rate versus airspeed. This particular plot is known as the glider's "polar". The curve shown illustrates the performance of an actual and typical modern glider.

The foregoing is the polar equation for the curve 1 in FIG. 2. Note that sink increases generally with speed, but it increases as a function of the square of the load factor term. The present invention is directed primarily toward minimizing or eliminating the effects of load factor (L) variations on the variometer display.

The curve 1 of FIG. 2 is called the "polar" of the glider and depicts glider performance versus speed. Each glider has a polar unique to that glider. The exemplary polar depicted in FIG. 2 represents the polar of an actual modern high performance glider. The shape of the polar predicts the quality of the flight performance of the glider such as the minimum sink rate 2 and speed 3 and best glide rate 4 and speed 5. The shape of the polar is determined by such factors as surface smoothness, streamline, wing platform, airfoil etc.

The shape of the polar of a given glider can be estimated with usable accuracy via either of the following two sets of readily measurable flight properties of that glider:

Minimum Sink rate and speed (2 and 3 resp. of FIG. 2) or

Best glide rate sink rate and speed (4 and 5 resp. of FIG. 2).

The mathematics of the polar curve are such that minimum sink occurs approximately at that airspeed where the value of induced drag is three times that of the parasitic drag, ($D_i = 3D_p$). Similarly, best glide ratio occurs approximately at the airspeed which results in equal values of induced and parasitic drag, ($D_i = D_p$). Using this information and knowledge of the form and factors of the polar equation (1), the following equations are derivable:

$$S = S_{Min}/4[3L^2/(V/V_{Min}) + (V/V_{Min})^3] \text{ and} \quad (2)$$

$$S = S_{L/D\ max}/2[L^2/(V/V_{L/D\ max}) + (V/V_{L/D\ max})^3] \quad (3)$$

where
S is the glider's calculated sink rate at airspeed V,
$S_{Min}$ is the glider's measured minimum sink rate;
$V_{Min}$ is the glider's measured airspeed at $S_{min}$;

$S_{L/Dmax}$ is the glider's measured sink rate at best glide rate;
$V_{L/Dmax}$ is the glider's measured airspeed at $S_{L/Dmax}$;
L is the load factor on the wings; and
V is the glider's airspeed.

Equations (2) and (3), above, are used in this invention to mathematically "model" glider performance. Other useful models equivalent to (2) and (3) are known and are derivable.

Attention is now called to FIG. 1 which illustrates, in block diagram form, a system in accordance with the present invention, for devising an acceleration corrected total energy variometer. In FIG. 1 a conventional electric variometer 1 senses static barometric pressure and from it develops the sink or climb rate, S, of the glider. S along with airspeed, V, are supplied as inputs to a conventional total energy calculator 3. The output, $S_{TE}$, of the total energy calculator is a quantity representing the glider climb/descent rate information conventionally displayed, via meter, to the pilot in modern gliders. The balance of the equipment illustrated in FIG. 1 is directed to enhancing the interpretability of the total energy information by diminishing or eliminating the effect of the load factor(L) variations.

As illustrated in FIG. 1, the total energy signal $S_{TE}$ is supplied to a differencing device 9 along with a signal selected by an optional switch 8. The output of the differencing device is supplied to an analog or digital display 10 for pilot monitoring. The switch 8 is not essential to the invention but does provide selectable alternate information displays which in practice could prove useful to the pilot. As illustrated in FIG. 1, three alternate displays are possible depending on which signal is selected for input to the differencing device 9.

(1) In TE position the selectable input is grounded so the pilot's display 10 communicates simple conventional total energy variometer information.

(2) In the ACTEV (acceleration corrected total energy variometer) position, the selectable input is $S_D$, component of sink due exclusively to glider drag. Thus the pilot's display 10 communicates $S_{TE}-S_D$ which in steady state is glider climb/descent rate due solely to vertical air mass movement with all aspects of sink due to glider drag having been stripped away.

(3) In the ACTEV/$s_{MIN}$ position, the output of the differencing device 9 is $S_{TE}-S_D+S_{MIN}$ where $S_{MIN}$ is that sink rate due exclusively to glider drag which would occur if the glider were flying at it's minimum sink speed, $V_{MIN}$. The pilot's display 10 then communicates the climb or descent rate which would occur for the glider flying in that air mass at minimum sink speed. This information might be useful to the pilot flying at high speed cruise between regions of lift.

Referring still to FIG. 1, the term $S_D$ which corresponds to glider sink due exclusively to glider drag, is developed by the DRAG SINK CALCULATOR 6. Variable inputs to the DRAG SINK CALCULATOR 6 are supplied by the LOAD FACTOR SENSOR 4 and the AIRSPEED SENSOR 2. The LOAD FACTOR SENSOR 4 is typically an accelerometer device arranged to sense and report accelerations in the direction orthogonal to the plane of the wings of the glider. The AIRSPEED SENSOR 2 is typically an aircraft pitot type device similar to those in common use on aircraft of all sorts. Constant inputs to the DRAG SINK CALCULATOR 6 are supplied by the adjustable GLIDER PARAMETERS 5. These are in the nature of screwdriver adjustments. They would be adjusted prior to flight and, typically, when the variometer is installed in the aircraft. They would be adjusted to correspond to one of the two sets of information: $S_{MIN}$ and $V_{MIN}$ or, $S_{L/DMAX}$ and $V_{L/DMAX}$ which, as described previously, can characterize the polar of the glider. Operation of the DRAG SINK CALCULATOR is illustrated in greater detail in FIGS. 5A and 5B.

The $S_D-S_{MIN}$ term of FIG. 1 is developed by the difference device 7 from the inputs $S_D$ and $S_{MIN}$ both of which are in turn developed by the DRAG SINK CALCULATOR 6.

Figure 5A:
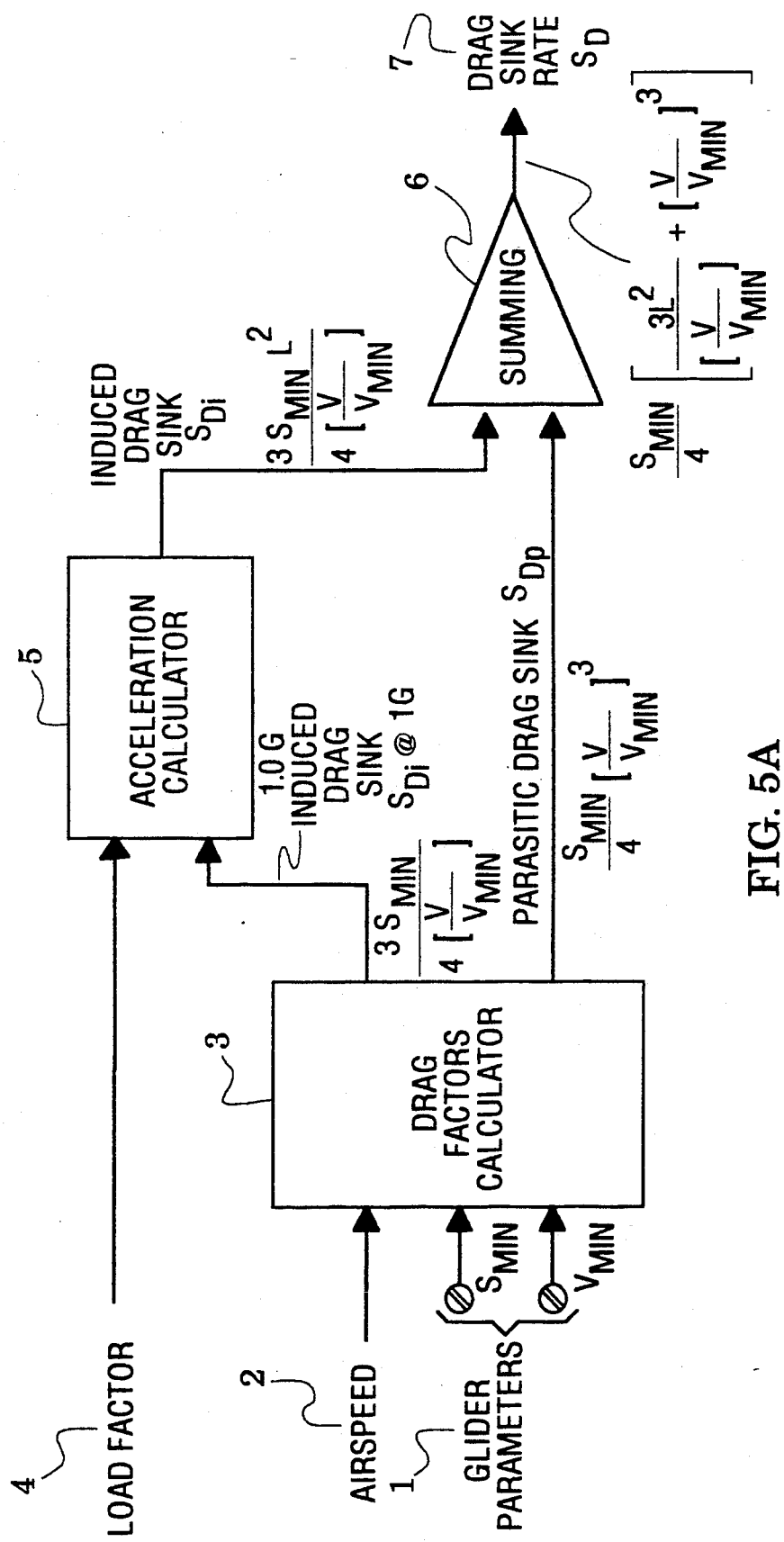
FIG. 5 is a more detailed block diagram of the DRAG SINK CALCULATOR of FIG. 1. It illustrates an implementation in which drag energy rate is calculated from the input factors, airspeed and load factor using the glider's minimum sink parameters, $S_{Min}$ and $V_{Min}$.
FIG. 5B is similar to FIG. 5A except it uses the glider's Best Glide Ratio parameters, $S_{L/D.Max}$ and $V_{L/D.Max}$ rather than Minimum Sink parameters.
Figure 5B:
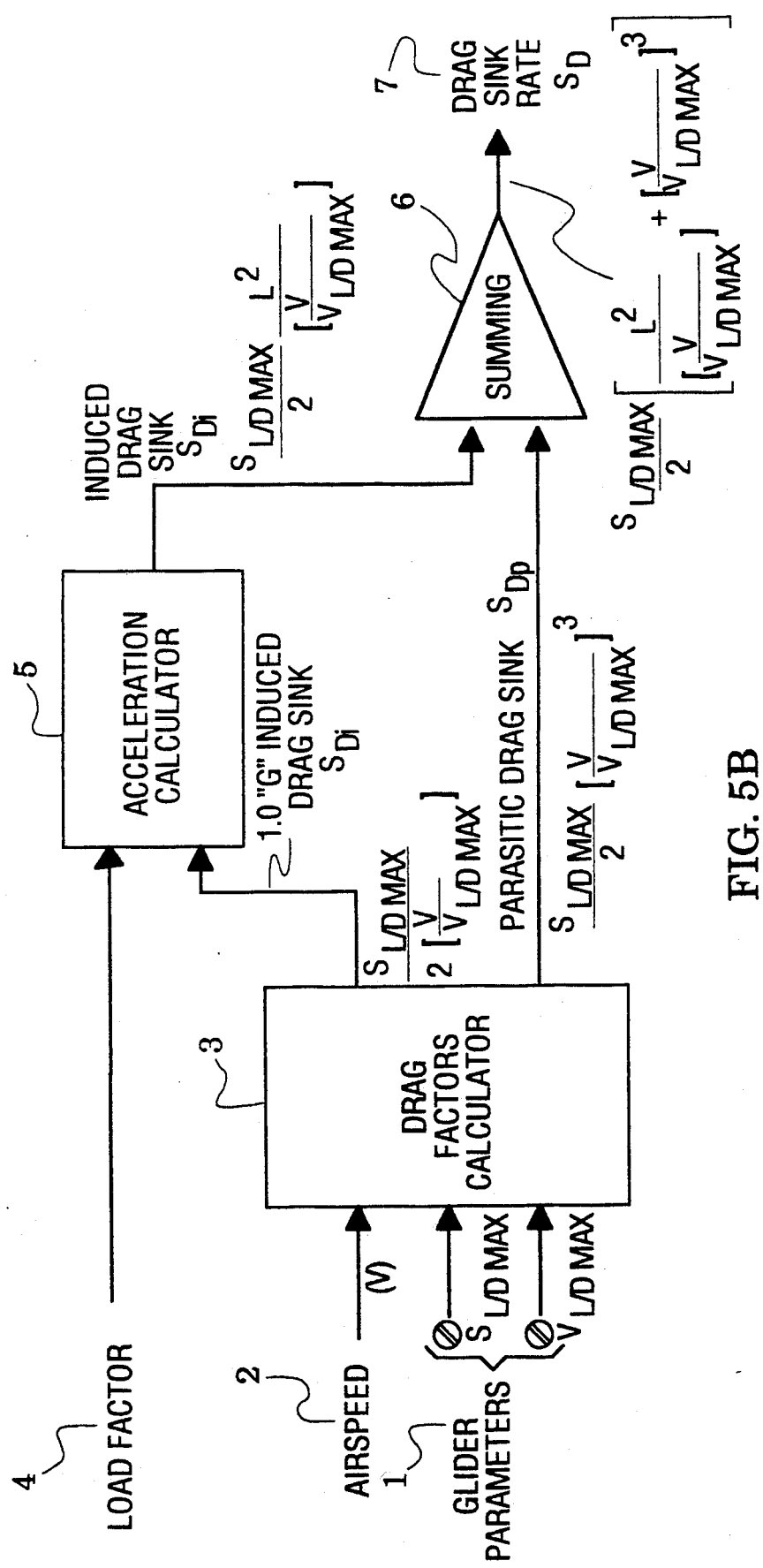

The DRAG SINK CALCULATOR 6 of FIG. 1 functions to compute Glider sink, $S_D$, using one or the other of the polar equations: (2) or (3). FIGS. 5A and 5B illustrate alternative implementations of the DRAG SINK CALCULATOR 6.

In FIG. 5a equation (2), is implemented using the minimum sink glider parameters $S_{MIN}$ and $V_{MIN}$. Sink components due to induced and parasitic drag for 1.0 G are computed by the DRAG FACTORS CALCULATOR 3 using the minimum sink parameters 1 and airspeed 2. Sink due to induced drag is calculated as $$S_{Di}@1G = 3S_{MIN}/4(V/V_{min}).$$

while sink due to parasitic drag is calculated as $$S_{Dp} = \frac{S_{MIN}}{4} \left( \frac{V}{V_{MIN}} \right)^3$$

Load factor 4 is squared in the ACCELERATION CALCULATOR 5 and multiplied by $S_{Di}@1G$ to develop $$S_{Di} = 3S_{MIN}L^2/4(V/V_{MIN}).$$

The induced and the parasitic drag terms $S_{Dp}$ and $S_{Di}$ are then summed at 6 to produce the glider's sink rate due to drag, $$S_D = \frac{S_{MIN}}{4} \left[ \frac{3L^2}{\left( \frac{V}{V_{MIN}} \right)} + \left( \frac{V}{V_{MIN}} \right)^3 \right]$$

The DRAG SINK CALCULATOR of FIG. 5B is similar to that of FIG. 5A except that the Maximum L/D parameters, $V_{L/Dmax}$ and $S_{L/Dmax}$ are used. As a consequence the equations solved differ somewhat. The result, however, is equivalent. The output is again glider's sink rate due to drag, but in this case $$S_D = S_{L/Dmax}/2[L^2/(V/V_{L/Dmax})+(V/V_{L/Dmax})^3].$$

Figure 6:
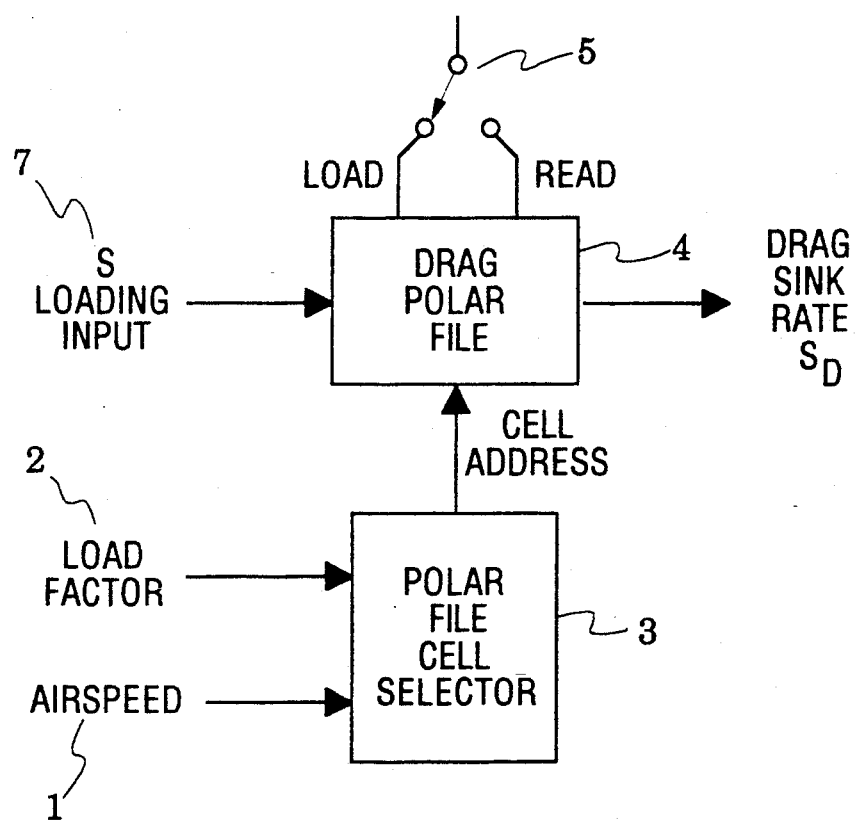
FIG. 6 illustrates an alternate implementation in which Drag Sink Rate is developed using Load Factor and Airspeed to select the appropriate value from file of previously stored polar data.

An alternate method of developing glider sink rate due to drag is illustrated in FIG. 6. In that method, glider polars are previously stored in a non volatile memory 4. The appropriate sink rate is read out as needed using load factor and airspeed combined as a memory cell address.

Operation of the system of FIG. 6 is as follows. The POLAR FILE CELL SELECTOR 3 develops a cell address using airspeed 1 and load factor 2. The DRAG POLAR FILE memory 4 is loaded by placing the LOAD/READ switch 5 in the LOAD position. Then as airspeed 1 and load factor 2 are incremented through their ranges, an $S_D$ value appropriate for the increment and for that glider is supplied at the S LOADING INPUT 7. The loading process would typically take place when the variometer instrument is first installed in the glider. For normal operation of the instrument as a variometer the LOAD/READ switch 5 is placed in the read position. In flight, airspeed 1 and load factor 2 are supplied by sensors to the POLAR FILE CELL SELECTOR 3 which in turn develops a cell address with which to access the DRAG POLAR FILE 4. The DRAG POLAR FILE, in turn, retrieves the appropriate drag sink rate $S_d$ from the selected cell.

It is noted that this invention can be implemented in a variety of equivalent technologies including digital electronic, analog electronic, mechanical, electromechanical and pneumatic as well as in combinations thereof. Similarly, numerous alternative sequences of calculation and arrangements of components can be used to implement this invention, all intended to be encompassed within the scope of the appended claims.

Although the description herein has been directed to the subcategory of aircraft commonly referred to as "glider", it is recognized that the invention more generally applies to any winged aircraft in non-powered flight, or in powered flight if supplied energy is taken into consideration.

I claim:

1. Apparatus for use in a glider for indicating the rate of vertical air mass movement comprising:
   means for producing a signal indicative of the rate of climb of said glider;
   means responsive to acceleration orthogonal to the plane of the glider's wings and glider airspeed for generating a sink rate signal attributable to the glider's drag; and
   means responsive to the difference between said rate of climb signal and said sink rate signal for generating a difference signal representing the rate of vertical movement of said air mass.

2. The apparatus of claim 1 wherein said means for producing said rate of climb signal includes means for representing changes in the sum of the gliders kinetic and potential energy.

3. Acceleration corrected total energy variometer for a glider in an air mass, comprising:
   means, for generating a glider total energy signal corresponding to changes in the sum of the glider's kinetic and potential energy;
   means responsive to acceleration orthogonal to the glider wings and glider airspeed for generating a sink rate signal attributable to the glider's drag; and
   means, responsive to the difference between said total energy signal and said sink rate signal, for generating a difference signal representative of the rate of vertical movement of said air mass.

4. A variometer as defined in claim 3 wherein said sink rate signal generating means comprises:
   means responsive to said acceleration and said airspeed for generating an induced drag sink rate signal;
   means responsive to said airspeed and the polar characteristic of said glider for generating a parasitic drag sink rate signal; and
   means responsive to the sum of said induced drag sink rate signal and said parasitic drag rate signal, for generating said drag sink rate signal.

5. A variometer as defined in claim 4 including means for generating said glider polar characteristic as a function of the glider minimum sink rate and glider airspeed corresponding thereto.

6. A variometer as defined in claim 4 including means for generating said glider polar characteristic as a function of:
   the glider best glide ratio sink rate and the glider airspeed corresponding thereto.

7. A variometer as defined in claim 3 wherein said drag sink rate signal generating means comprises:
   means responsive to said acceleration and said airspeed, for generating a cell address signal; and
   memory means responsive to said address signal, for generating said sink rate signal.

8. A variometer as defined in claim 5 further comprising means, responsive to said glider minimum sink rate and said difference signal, for generating a climb/descent rate signal representing the glider climb/descent rate when flying at an air speed corresponding to said minimum sink rate in said air mass.

9. A variometer as defined in claim 3 further comprising means, responsive to said difference signal and visible to the glider pilot, for displaying an indication corresponding to said difference signal.

10. A method for providing, for a glider, an acceleration corrected climb/descent rate signal, comprising:
    generating in response to glider airspeed and barometric pressure of the air mass surrounding the glider a glider total energy signal corresponding to changes in the sum of the glider's kinetic and potential energy, said total energy signal being representative of the glider's climb/descent rate;
    generating in response to acceleration orthogonal to the plane of the glider wings and glider airspeed, a drag sink rate signal; and
    generating a difference signal equal to the difference between said total energy signal and said drag sink rate signal, said difference signal representing that component of said climb/descent rate due to said air mass.

11. A method as defined in claim 10 wherein said drag sink rate signal generating step comprises:
    generating in response to said acceleration and said airspeed an induced drag sink rate signal corresponding to that component of said drag sink rate signal due to the glider's induced drag;
    generating in response to said airspeed and said glider flight parameters a parasitic drag sink rate signal corresponding to that component of said drag sink rate signal due to the glider's parasitic drag; and
    summing said induced drag sink rate signal and said parasitic drag rate signal to produce said drag sink rate signal.

* * * * *